United States Patent [19]

Lapeyre

[11] Patent Number: 5,383,141
[45] Date of Patent: Jan. 17, 1995

[54] COMPUTER WITH FEW KEYS DISPLAYING HUNDREDS OF FUNCTIONS

[75] Inventor: James M. Lapeyre, New Orleans, La.

[73] Assignee: The Laitram Corporation, New Orleans, La.

[21] Appl. No.: 17,341

[22] Filed: Feb. 11, 1993

Related U.S. Application Data

[63] Continuation of Ser. No. 919,382, Jul. 29, 1992, abandoned, which is a continuation of Ser. No. 786,829, Nov. 1, 1991, abandoned, which is a continuation of Ser. No. 787,633, Oct. 15, 1985, abandoned, which is a continuation-in-part of Ser. No. 459,998, Jan. 21, 1983, Pat. No. 4,547,860.

[51] Int. Cl.[6] ............................................. G06F 3/023
[52] U.S. Cl. ............................ 364/709.16; 364/709.15
[58] Field of Search ...................... 364/709.16, 709.15

[56] References Cited

U.S. PATENT DOCUMENTS

| | | | |
|---|---|---|---|
| 3,675,513 | 7/1972 | Flanagan et al. | 364/709.16 X |
| 3,833,765 | 9/1974 | Hilborn et al. | |
| 3,892,958 | 7/1975 | Tung | |
| 3,967,273 | 6/1976 | Knowlton | |
| 4,279,022 | 7/1981 | Abe | 364/705.06 X |
| 4,344,069 | 8/1982 | Prame | |
| 4,385,291 | 5/1983 | Piguet | |
| 4,547,860 | 10/1985 | Lapeyre | |
| 4,695,983 | 9/1987 | Oda et al. | 364/709.12 X |

FOREIGN PATENT DOCUMENTS 57-136244 of 1982 Japan.
1417849 12/1972 United Kingdom.

OTHER PUBLICATIONS

C. K. Clauer, et al. IBM Technical Disclosure Bulletin, vol. 21, No. 10, Mar. 1979.

*Primary Examiner*—Tan V. Mai
*Attorney, Agent, or Firm*—Laurence R. Brown; James T. Cronvich

[57] ABSTRACT

Utility of keyboard controlled multipurpose calculating computers with large numbers of modes of operation on data is substantially increased by making available these modes of operation with fewer keys on the keyboard and relating the keyboard keys to integral keyboard panel carried operating instructions identifying hundreds of accessible operating steps and functions. Typically 12 or 16 key keyboards will initiate considerably more than a hundred different input characters and instructions each clearly identified so that the computer can be used for most of its intended purposes at all times by relatively unskilled operators without reference to instruction manuals. The operating mode requires two successive instantaneous keystrokes for one entry, and the two keystrokes necessary for each of the accessible operating modes and input characters are displayed adjacent the keys for indicating the keys to stroke for each desired entry.

5 Claims, 6 Drawing Sheets

Fig. 6

COMPUTER WITH FEW KEYS DISPLAYING HUNDREDS OF FUNCTIONS

This application is a continuation of application Ser. No. 07/919,382, filed Jul. 7, 1992, now abandoned, which is a continuation of application Ser. No. 07/786,829, filed Nov. 1, 1991 now abandoned, which is a continuation of application Ser. No. 06/787,633, filed Oct. 15, 1985, now abandoned, which is a continuation-in-part of 06/459,998 filed Jan. 21, 1983 U.S. Pat. No. 4,547,860.

TECHNICAL FIELD

This invention relates to keyboard operated computers and more particularly it relates to computer systems providing access to a large number of computer functions with few keys.

BACKGROUND ART

This is a continuation-in-part of my copending application Ser. No. 459,998 filed Jan. 21, 1983, now U.S. Pat. No. 4,547,860 granted Oct. 15, 1985.

The trend in computers is to add keys to match the need for access to more of the computer functions made available with modern computer chips. Hand held computers regularly employ 40 keys and desk top computers often have well over 100 as standard. Even so, keyboards have not kept pace with the proliferation of computer chip functions available in the art, literally numbering in thousands for a single standard chip. Thus, as computers become more powerful and compact, keyboards are becoming more bulky and confusing. This trend, in ergonomic terms, is hardly to be considered a good one, since in order to have computers used with ease by more people it is imperative that the user/computer interface be simplified both in structure and in logic.

Computer U.S. Pat. No. 3,892,958—Jul. 1, 1975 to C. C. Tung is exemplary of the trend by some manufacturers in the keyboards they offer. The objective is to reduce the number of computer keyboard keys, yet 35 keys are still used. Prefix keys (gold—f and blue—g) are added for use in activating the keyboard in alternative computer selection modes to permit the keyboard to select three different functions per key. This extends the range of a 39 key keyboard available in a Hewlett Packard Model 15C computer, for example, to make accessible more of the computer chip built-in operating functions and program modes, namely 96, but at a cost of additional keys. Still 96 functions are undoubtedly far less than the several hundred available on computer chips in the present state of the art. Thus, access to full capacities of the chips is not feasible with the prior art keyboards, and a relatively large number of keys is still required to significantly extend the keyboard capacity to select more functions available on the chip. With this type of computer an external catalog of available computer entry conditions not shown on the keys is necessary, for example, to show the various operating conditions available in the program mode. For these type of portable hand held computers, the programming manual usually takes up more volume than the entire computer, which is limited in size only by the dimensions of the keyboard and display because of the micro-electronics employed.

Furthermore, with the 39 keys (or more as required to process more of the modes available on current powerful chips) in a hand held pocket-sized computer, the keys have to be placed so close together that it is difficult to make choices manually without fingering a wrong key. Also a sequence of reasoned selections must be made on prior art keyboards that interrupts the mental process and thereby introduces many opportunities for potential error into the key selection process.

This potential for error in manual selection of computer functions is even more pronounced whenever there are routines performed which are not indicated visibly on the keyboard in easy to identify and follow notation. Prior art keyboards have not resolved the problem of how to indicate two or more successive keystrokes necessary to complete some of the selectable functions or programs except for the aforesaid example which color codes a prefix key with a code abbreviation of the functions made accessible thereby. If complex key stroke sequences for various functions need be memorized or intermediate reference made to an instruction manual, the propensity for error is increased by the further interposition of unrelated thought processes. Thus, it has not been possible to provide access directly adjacent the keyboard keys of the necessary information for using a computer to perform several functions in many modes of operation. This is particularly true for pocket-sized computers where keyboard space is necessarily limited. Even desk-top computers which have to be programmed by mathematics and engineering oriented persons who are not expert typists are difficult for some users as they must "hunt and peck" among the more than one hundred keys which are usual on such keyboards.

The computer U.S. Pat. No. 3,892,958 does provide a limited amount of flexibility to the use of keys on the keyboard as identified by visible keyboard legends. Thus, the keyboard is usable in three different modes for function selection. To activate the two additional modes a manual selection of a color coded key is required such as gold (f) and blue (g) to correspond to three color coded legends for the keys on the keyboard panel facing or key. The limitation of this system, similar to the shift key on the typewriter, is to substantially triple the number of functions accessible by the keyboard. There is no way taught in the prior art for using substantially all the functions available from the computer chip with a simple keyboard having a few keys.

Clearly there is a bottleneck not resolved in the prior art, namely a computer-keyboard system that will provide with a reasonably small number of keys complete access to a general computer's wide range of modes of operation as well as to enter numerical digits, alpha characters and other data or instructions.

Furthermore, with this significant increase in key functions available, it is a most complex and difficult problem to teach relatively unskilled persons to operate the computer under all operating conditions. The prior art relating to pocket-sized general purpose computers requires instruction manuals many times larger than the computer containing complex operating instructions and tables. This is another significant problem not resolved in the prior art.

DISCLOSURE OF THE INVENTION

This invention requires two or more successive keystrokes to make an entry in a manner permitting as few as twelve keys to provide as many as 156 selections. The corresponding 156 selections are graphically displayed at the keyboard in a manner such that the computer is always ready for operation without further reference to an instruction manual.

The computer keyboard system has a set of a few (X) keyboard keys, such as twelve but less than the number of alphabetic characters (26), for entering data and communicating with the computer chips, wherein the keys execute substantially more than three functions per key. Surprisingly a few keys such as 12 can execute a very large number of functions, such as 156, and yet the operating steps are not complex. Furthermore, there is a distinct advantage in spacing fewer keys a greater distance apart, not only to reduce errors in fingering an unwanted key, but also to provide graphics room for charting the plurality of functions selectable by each of the keys. A keyboard having few keys is advantageous also because the keys may be placed within reach of the fingers of one hand without large hand movements thereby making possible use of a touch system in fingering the keys. I estimate that if a computer could be programmed using only 12 to 16 keys by the touch system then programming time could be cut by a factor of 3.

Ten decimal digit keys (0 to 9), a decimal point key and a function execute key (XQ) comprise a preferred number of keys (12) since they can be used while retaining the important function of entering decimal digits with a single keystroke to form multi-digit numerical words by successive sequential keystrokes. Preferably, but not necessarily, the computer operates in Reverse Polish Notation (RPN) logic in which a simple arithmetic function proceeds in different sequence than the arithmetic convention. Thus, the arithmetic problem $y+z=a$ proceeds in response to the successive keystrokes y, enter, z, plus, to display the answer a.

The keyboard versatility is attained in one embodiment by employing a computer operating mode which changes from a first data entry mode with a live keyboard permitting single stroke entry of the decimal digits, and other key designated functions such as decimal, and $+$, $-$, $\div$, $\times$, etc. if desired.

Data may be entered by sequentially selecting digits of a first word (operand y) and signalling entry by shift into a different (y) register, preferably by using a second stroke of a decimal point key in the word (normally not used and inactive) as an entry signal. This saves a separate entry key. The second word (g) is then entered. In some cases, $\sqrt{y}$ for example, only one word (y) need be entered. After the single or double data word is entered, the execute button (XQ) is activated to initiate a second computer mode activating the keyboard keys to execute a different set of designated functions in response to the sequential selection of n successive keystrokes, n being greater than one and preferably two. However, the greater n is, the more functions can be connected for keyboard accessibility. Accordingly, in the second mode $(12)^n$ key actuated selections are made available in addition to 12 in the first mode. Thus, 156 functions in a modern computer chip may be made accessible. With a three stroke sequence in the second mode and 12 keys therefore 1728 functions are available for keyboard access in the second mode.

The invention furthermore provides an integral graphic display panel chart carried With the computer and positioned adjacent the keyboard on the front panel to be visible with the keyboard for identifying the accessible functions by appropriate abbreviated legends together with keystroke sequence for selecting each function. Thus, it seldom becomes necessary to consult an instruction manual, which can be larger than tile computer.

The combinational interrelationship of the keyboard and keyboard displayed instructions for essentially the entire operational capacity of a large capacity general purpose computer have never before been combined so that the computer can be used at all times over its range of utility by relatively unskilled operators without detailed reference to an instruction manual. This is particularly essential in portable hand-held computers.

Thus, the computer is self taught over its whole range of capabilities from the keyboard itself even to novice operators.

There is no need for continual practice and memory to be able to operate the computer, in accordance with this invention, which integrally on its keyboard panel shows the sequence of the two keystrokes for executing each available keyboard character or instruction entry to the computer operating means.

BRIEF DESCRIPTION OF THE DRAWINGS

FIG. 6 is an alternate compact keyboard array for special usage.

THE PREFERRED EMBODIMENTS

Figure 1:
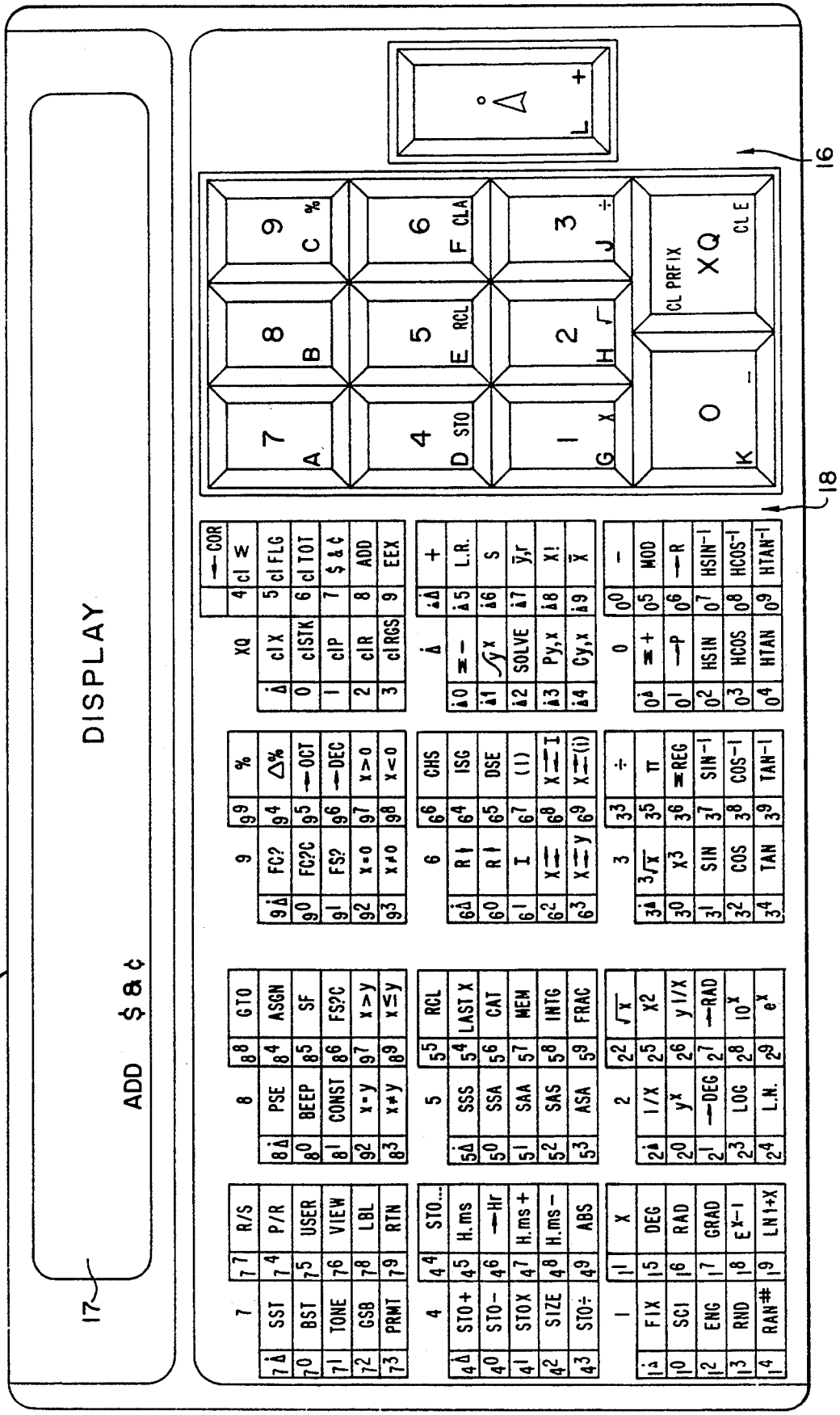
FIG. 1 is a front panel sketch of a portable twelve key computer keyboard, temporary electronic display screen, and graphic display chart of selected functions and modes accessible by this invention.

The computer keyboard system of FIG. 1 afforded by this invention is incorporated in a portable computer 15, with twelve keyboard keys 16 bunched on the right hand side of the keyboard front panel. The temporary electronic display screen 17 is disposed along the length of the casing, thereby providing the space in the left hand side of the keyboard panel for disposing a graphic display panel chart 18 identifying the various computer functions, sub-routines and modes, etc. accessible to keyboard selection. Also, the chart indicates the necessary keyboard strokes for each function.

In accordance with this invention therefore, the twelve keys 16 serve to select any of the 133 listed functions plus the original twelve functions shown in bold face legend on the keyboard keys plus miscellaneous further functions and other modes for a total capacity of about 150 functions selectable with only 12 keys. Note that the decimal (.) key is used for dual purposes in the first mode to enter a numerical word on the occurrence of the second decimal point in each string of sequential decimal digits as indicated by the arrow. This further serves to reduce the number of keys necessary on the keyboard to make possible complete and convenient access to the various ones of the functions available.

There are other optional differences within the framework of this invention. For example if the XQ key is used as a Clear key (CL) to void an incomplete selection of a function then the total functions accessible by the keyboard is: $(X \times (X-1)^{n-1})+1$. If the XQ key is not desired to be used as a Clear key as stated above, then the total number of functions accessible by a keyboard is $X^n$.

Where:

X = Total keyboard keys.

n = Number of keystrokes in sequence required for function selection.

The following charts will serve to show that very large numbers of functions can be addressed with few keys depending upon the number (n) in the keystroke sequence used:

| $(X \times (X-1)^{n-1}) + 1$ (Preferred) Using XQ as a clear for incomplete function selection FUNCTIONS ACCESSIBLE | | | $X^n$ Not using XQ as a clear for incomplete function selection FUNCTIONS ACCESSIBLE | | |
|---|---|---|---|---|---|
| X | n | | X | n | |
| 12 | 1* | 13 | 12 | 1 | 12 |
| 12 | 2 | 133 | 12 | 2 | 144 |
| 12 | 3 | 1,453 | 12 | 3 | 1,728 |
| 12 | 4 | 15,973 | 12 | 4 | 20,736 |
| 16 | 1 | 17 | 16 | 1 | 16 |
| 16 | 2 | 241 | 16 | 2 | 256 |
| 16 | 3 | 3,601 | 16 | 3 | 4,096 |
| 16 | 4 | 54,001 | 16 | 4 | 65,536 |

*in ADD MODE - where provided

In a preferred embodiment the keyboard is live in a first data entry mode for entering decimal digits 0 to 9 and the decimal point and also to shift the computer mode for a data processing or function selection mode with a single keystroke. The execute key (XQ) on its second successive stroke serves a clear function to correct (←COR) and clear the last entry. The decimal key (.) when actuated the second time within a numeric word serves as an enter key to enter the word into a y register as an operand. This is possible because a second decimal point is never found in a numeric word.

These features aid the use of this minimum number of twelve keys on the keyboard without sacrificing the rapid data entry characteristic using a single keystroke to enter a decimal digit. Furthermore, keyboard accessibility is provided to more computer functions per key than before believed feasible. Thus, the trend in the computer art toward more and more keys on the keyboard in able to utilize more of the computer scope of operations is reversed.

To achieve this, a second mode of operation is established by the execute key (XQ), namely the function selection mode, wherein the live keyboard used for data entry is converted to require two keystrokes per function selection, thereby producing 144 function selection possibilities.

It will be noted that if the computer is put into the ADD mode by executing XQ8 then the stroking of the decimal point a second time directly adds the keyed in number to the previous total shown in the display. In the ADD mode then, the functions shown in the lower right hand corner of the keys may be accessed by a single stroke of the appropriate key following a stroke of the XQ key. Note that all of these functions and operational steps are explicitly clear from the keyboard indicia.

Example: Go to the ADD MODE:

(XQ) (XQ) (8) ADD appears in the display.

Then to add numbers 15.75+16.98+20.32 the keystrokes are as follows assuming the display has been cleared

| | |
|---|---|
| (XQ) (XQ) (6) | DISPLAY: 000 |
| | On the second stroke in this mode the decimal key becomes a + key, in the ADD MODE only. |
| (1)(5)(.)(7)(5)(+) | DISPLAY: 15.75 |
| (1)(6)(.)(9)(8)(+) | DISPLAY: 32.73 |
| (2)(0)(.)(3)(2)(+) | DISPLAY: 53.05 |

Now if 3.58 is to be subtracted from the displayed total simply stroke:

| | |
|---|---|
| (3)(.)(5)(8) (XQ) (0-) | DISPLAY: 49.47 |

If while in the ADD mode 15% of the displayed number is required simply stroke:

| | |
|---|---|
| (1)(5) (XQ) (9) | DISPLAY: 7.4205 |

In addition to the example shown there is another mode for use primarily by the touch system 12-key keyboard and that mode is the $/¢ mode (XQ) (XQ) (7). In the $/¢ mode the computer "knows" where the decimal point has to be and therefore the first stroking of the decimal point key automatically adds the number and points off two places. For example, in the ADD mode and in the $/¢ mode, to add a column of figures the operator need only enter the pennies, i.e. 2539 ($25.39) and on the first stroke of the decimal point key the number is added. This saves all stroking of the decimal key, as a decimal point, which has now become a plus key.

Frequently used functions are located for quick and convenient reference and access by two successive strokes of the same key in the function selection mode, as indicated in the upper right hand cell of each cell block in chart 18. The bold arrow on the decimal key designates the enter function for its second stroke in the keyboard entry mode. The alphabetic characters on the lower left of the keys are available for designating programs in the program mode when labelling (LBL) is required and thus are accessible by three keystrokes. Note that eleven functions are selectable that require a first 7 keystroke in the upper left box of chart 18 adjacent 7 in eleven different cells. (In this embodiment therefore the execute key (XQ) is not used as a second keystroke selection, and only 132 function selections as illustrated in the various cell blocks as designated or accessible functions.) Thus, the second keystroke 8 will initiate the label (LBL) mode for selection of the alphabetic character to produce a set of 11 selections with a three successive keystroke sequence. Thus to provide an "A" label then, (when in the program mode) the key sequence 7-8-7(the last 7 being the A since in the program mode the XQ is presupposed and therefore automatic).

The graphic display chart 18 therefore identifies the available functions together with the keystroke sequence required to select any particular one of the functions, and the keyboard 16 having few keys can select hundreds of such functions. For the first time, a casual user can immediately use a general purpose computer for any of its usual capabilities without a study course, refresher sequence or reference to catalog tables.

Figure 2:
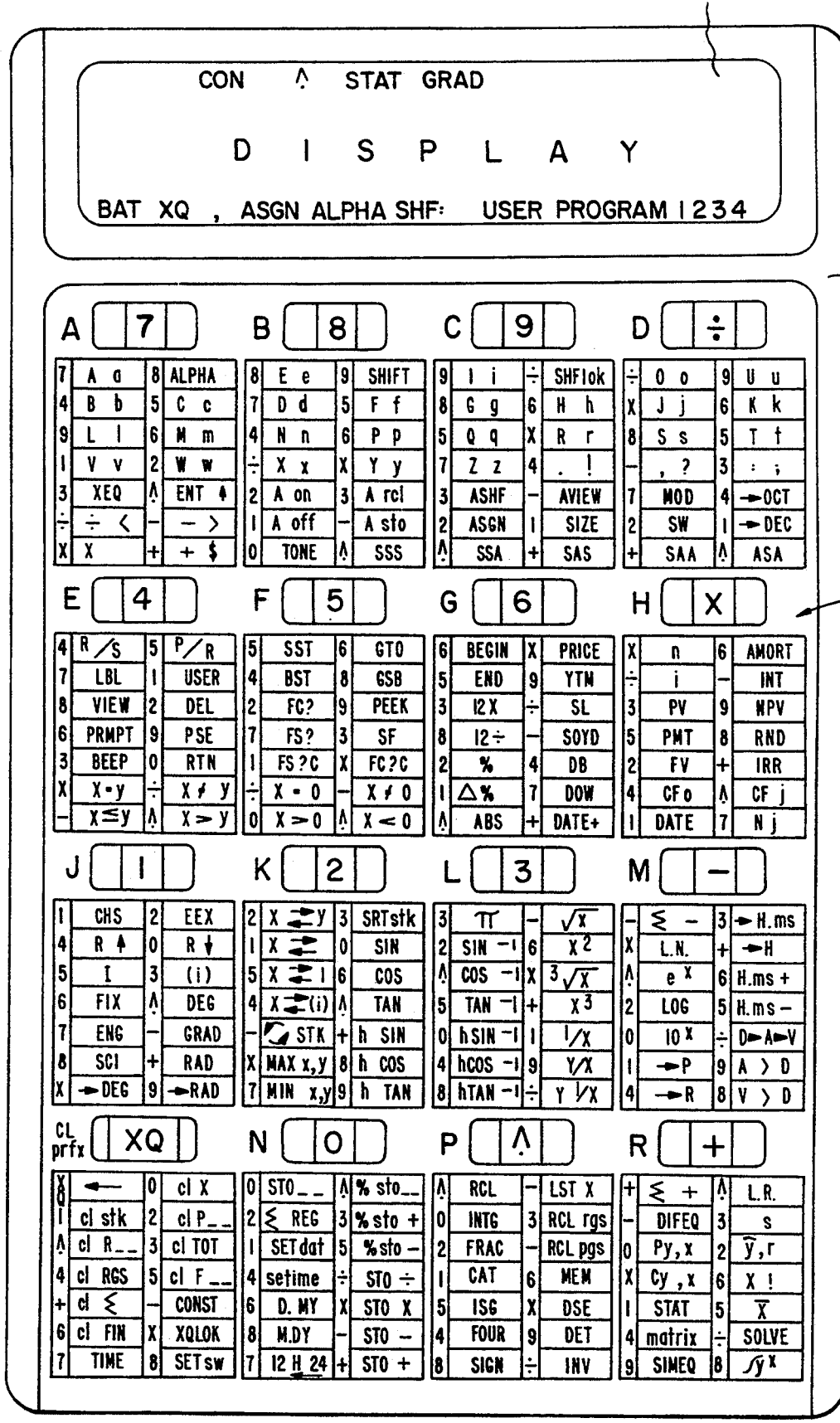
FIG. 2 is a further computer keyboard panel embodiment of a pocket-sized hand-held computer having a different display screen aspect ratio and a sixteen key keyboard.

The hand-held computer 20, of FIG. 2, operates in a similar manner with sixteen keys so that the commonly used calculating functions ÷, ×, −, + may be executed directly in the data entry mode without an intermediate "execute" keystroke. In this embodiment 224 functions are listed in the cells with fourteen functions accessible for each keyboard key. A maximum of sixteen functions can be used for each key with a sixteen key keyboard. This embodiment has the additional advantage that this invention provides of using few enough keys to be separated by a relatively large space on the keyboard for ready manual selection without interference with adjacent keys formerly required because many keys were necessary to process a large number of functions. Also, this provides a format where each set of functions (fourteen) to be actuated by each key is located adjacent that particular key. Thus, key selection is made easier and less prone to mistake in the manual process.

Note that this keyboard, among other features, provides for alphabetic operation (alpha 7-8) in data processing with both upper and lower case (shift 8-9). The vowels, A for example, are made readily accessible by a double stroke of a single key (7—7), for fast access. Also it is convenient to find the desired functions when they are grouped according to relevance. Thus, alpha characters are used in connection with the upper keyboard. Fiscal data is grouped under the X key. Trigonometric functions are grouped under keys 2 and 3, and programming functions are found under keys 4 and 5, etc.

In general, with the entry of a problem, the number of keystroke selections is not increased over other keyboards with many more keys. Consider, for example, the multiplication of 12.32 by 6.28. The required successive keystrokes are 1-2.---3-2---6.- -2-8-x, of which the underlined two strokes only are for functional purposes (second decimal for enter operand 12.32 and × for multiply) and the others are data entry strokes. With the conventional operation of RPN (Reverse Polish Notation) the answer automatically appears then on the temporary electronic display screen 21. If there is no decimal point needed in an operand such as 15 then the use of the second decimal point entry mode to save an additional (enter) key requires a double stroke for entry, namely -1-5- - -, where the second decimal point enters 15 as second decimal point entry mode to save an additional the operand into a suitable register sometimes termed the "y" register.

As may be seen on the electronic actuable display screen 21 a set of indicia is automatically shown to indicate the special computer conditions, primarily the current mode in which the computer has been placed. Thus, several additional modes of operation may be established supplementing the basic data entry and function selection modes. In addition to the ADD and $/¢ modes already described some of the modes which activate the computer keys for special operation during a sequence of function selection steps thus are briefly described.

To go into the alphanumeric mode, the "alpha" selection is made (XQ-7-8), and the corresponding alpha mode will be displayed on screen 21. In this mode either upper or lower case alpha characters may be selected by further execution of the "shift" function (8-9—In the alpha mode the ⓧⓠ is not required since the computer already "knows" to expect an alpha selection and only a two keystroke sequence is required.) also shown on the display screen 21 to indicate the alpha case. If the lower case letters are to be locked in, then the "shift lock" function (SHFlok 9, ÷) is selected.

To enter statistical data, the "Stat" mode is selected (XQ, +, 1) and displayed on screen 21. In this and other modes a return to the mode setting function "Stat" will reverse the procedure and exit the previously selected mode. The statistical mode then permits use of arithmetic signs ⊙+ (ϵ+) and ⊙− (ϵ−) for entering data directly into the statistical registers without having to use the XQ key.

In the user mode when selected ⓧⓠ ④-①the user is permitted to run one of his programs with a single stroke of the key corresponding to the program label. For example, if the user has stored in the computer a program labeled "H" he can enter the user mode by ⓧⓠ ④-①. In that mode he can repeatedly run program H by a single depression of the ⓧ$^{(H)}$ key following a stroke of the 501 ⓧⓠ key.

In the program mode ⓧⓠ -④⑤ the SST function (single step through program lines) is accessed simply by stroking ⑤- ⑤. Upon release of the second stroke one line of the program will have been advanced. If the second stroke of the ⑤ is held depressed, then after a small time delay, the computer will automatically step through the program one line at a time until the key is released, just like some other computers. Likewise in the program mode the back step BST (⑤④) function will operate in the same manner except that in this case the ④ key is the last controlling key. To exit the program mode ④⑤ is executed again. BST (back step), P/R (program run), LBL (label) and other modes as well as the various algebraic sub-programs, etc. usual in computing operations are shown as functions on the corresponding cells for ready recognition and reminder. It is clear therefore that when this graphic display chart 18' is afforded that a hand-held computer is more useful without the necessity of frequent reference to an instruction manual and thus can truly be a pocket compuer that gives access to hundreds of functions selectable from few computer entry keys.

One particular feature of this invention is the "execute lock" function (XQLOK-XQ, XQ, X) which is used, for example, in the Program mode (and may be automatically engaged in the Program mode) to permit writing programs in successive steps without requiring the XQ keystroke before each selection of a function. This significantly reduces program entry keystrokes, time and the chance number of manual manipulations. Similarly the "constant entry" (CONS, ⓧⓠ , ⊖ ) in the program mode permits entry of numerics and the second stroke of the decimal point(.) key signals that the entry is complete and the constant entry mode is automatically exited allowing programming to continue in the Program mode.

This keyboard graphic display 18' in FIG. 2 has four separate sets of indicia to indicate the entire catalog of functions available. Thus, a primary key function is noted for the single keystroke data entry mode to which the computer returns after switching out of other modes by choice of keyboard functions or automatically after completing a calculation. This mode has as a minimum the decimal digit keys 0–9 and a decimal point key to enter serial digits of a numeric multi-digit word with successive single keystrokes. This is necessary to decrease chances of error, and to avoid unnecessary time consumption in data entry.

A second set of indicia identifies groups of designated functions selectable in the second function entry mode by each first actuated group selection key. These groups are positioned immediately under the corresponding keys for ready recognition and manual execution without a mental and physical jump to another portion of the keyboard than that at which the desired function is visually spotted. This avoids the propensity for error introduced by the search for a function legend ending up at one position on the keyboard and then going to another position to execute a group selection key, as required in the aforementioned patent, for example.

A third set of indicia comprises the selection key notation alongside each function cell. This identifies the second keystroke in the two-stroke selection process for each function that permits the access to as many as $X^2$ functions where X is the total number of keyboard keys. Thus 23 keys could process 529 functions, etc., in utilizing more of the built-in computer chip functions. In this embodiment a fourth indicia set is identified, namely the alpha characters A to R to the left of the keys, which are addressable in the program mode as program labels in the label select mode (LBL, XQ, 4, 7) by a single stroke of the key designating the desired label.

Note that if a conventional arithmetic mode of calculation is used rather than RPN, then the decimal point key can rather be labeled as an =key (equivalent to the execute key to cause the entered function to be executed).

It is to be noted that in order to signify the spirit and nature of this invention and the features novel in the art, those routine details well known in the art and the complexities of computer chips making accessible thousands of built-in functions are not necessary in teaching those in the art how to practice the invention, and thus are not set forth herein. Reference of the present state of the art can be made to commercially available computers such as various models made by Hewlett-Packard Company. Specifically reference can be made to the "Hewlett-Packard Model 15C" computer and corresponding instruction manual 00015-90001 entitled "HP-15C Owner's Handbook" printed March 1982 and issued by Hewlett Packard Corvallis Division, 1000 N. E. Circle Blvd., Corvallis, Oreg. 97330, which are incorporated herein by reference to indicate the state of the art and the nature of those techniques routinely adopted by those in the art at the present time. The above mentioned Model HP-15C is only one of many very small and powerful computers on the market today, all of which routinely incorporate so called "computer on a chip". The computer on a chip is often smaller than any one of the multiplicity of keys which are presently required to control its function. In view of this state of the art, where computer logic is routinely performed, keyboard keys are activated to operate in different modes, automatic subroutines are performed for shifting data to various registers, and keys are used for various switching and mode selection functions. The following block logic diagram of FIGS. 3 and 4 together with the foregoing description will enable those skilled in the art to connect the interface between a keyboard and a modern computer chip for operation as set forth herein in accordance with the present invention.

Figure 3:
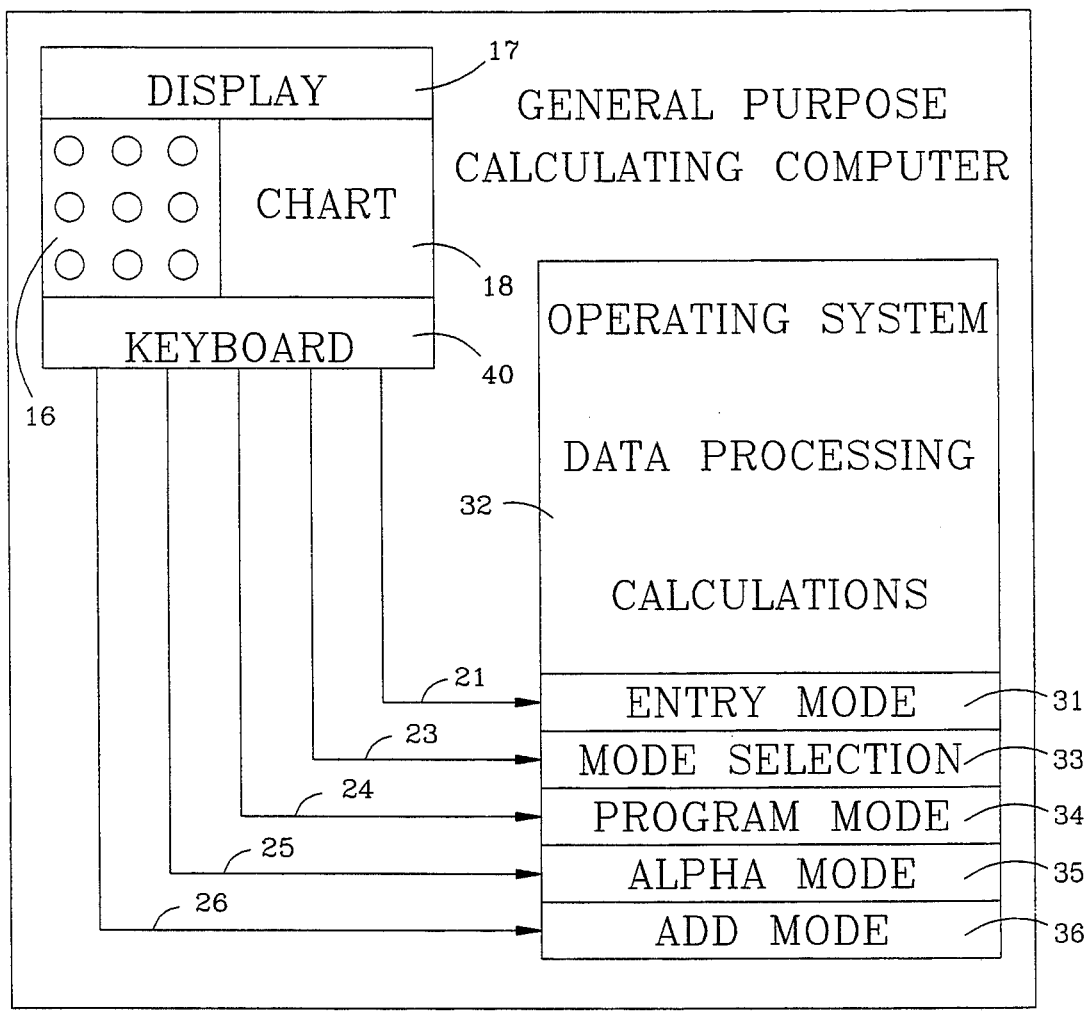
FIG. 3 is a block diagram organization of the computer-keyboard system afforded by this invention.

The general organization of the present system is shown in FIG. 3, wherein the general purpose computer may be of the general type before described, with operational features as shown in the block diagram. The keyboard portion hereinbefore described is identified by similar reference characters 16, 17 and 18.

An interface decoder system 41 includes means for detecting the two successive keystrokes to address the computer operational system, and could be constructed in the manner set forth in British Patent Specification 1417849 to H. Kafafian filed Dec. 20, 1972 or of the nature disclosed in U.S. Pat. No. 3967273 to K. C. Knowlton of Jun. 29, 1976. A somewhat similar system in U.S. Pat. 4,344,069 to E. S. Prame of Aug. 10, 1982 is not preferred since two keys must be sequentially selected and both held down, thus introducing a higher error rate and reducing the number of keyboard selections feasible. Another system, shown in U.S. Pat. No. 3,833,765 to E. H. Hilborn, et al., of Sep. 3, 1974 similarly uses two strokes for generating instructions of the nature of the British specification. All of these foregoing systems are limited in scope to the keyboard generation of coded information for data presentation by visual or typewriter display or telephone line access.

The manner of combining this type of coded input system with a general purpose computer to provide applicant's comprehensive general purpose computer is described with reference to FIGS. 3 and 4 for the logical interconnection and operation of the computer.

In FIG. 3, thus the two stroke detector and decoder 41 communicates with the internal computer operating system 30 for setting up various data entries and execution commands for selecting the computer operating modes. Thus, explicitly, selected decoded keystroke commands control the various computer functions of which the following modes are significant in the computer control system afforded by this invention.

The entry mode 31 provides for input data to be processed or manipulated by the data processing section 32, available in response to keystroke command signals for changing the entry mode, if necessary, as in the case of changing from the one keystroke entry mode for numerical data input and the two keystroke entry mode for alpha or command signal input entries. Line 21 indicates the logical entry of data from the keyboard when the computer is in the entry mode selected.

The various available computer operating modes 33 are selected by command signals from the keyboard 16 as diagrammatically indicated by line 23. These modes include the entry mode 31, the pro am mode 34, the alpha mode 35 and the add mode 36, which are separately selected by command signals from the keyboard as suggested by corresponding lines 24, 25 and 26.

These operations are integrally and combinationally related to the keyboard legends. For example, when the computer is operating in the add mode 36, as formerly described, the legends on the lower right corner of the keys constituting part of the charted graphical operational instruction data in FIG. 1 indicate that the live keys operable in the single stroke input mode are specifically modified to function for a different set of functions. As shown in the chart of FIG. 1, this mode is selected by the sequence of keystrokes XQ and 8. The add condition is a toggle and can be turned off by the same key sequence XQ and 8. Note that the display 17 designated the mode (ADD) in which the computer is operational.

To effect the entry mode, it is clear from the charted data of the FIG. 1 and 2 embodiments and foregoing discussion that the XQ command key on the first single stroke in the live keyboard mode changes the keyboard from the numerical entry mode called the live key mode, where numeric data is entered by single keystrokes, to a double-stroke entry mode where each entry requires two keystrokes and thus uses the decoding system 41 similar to that in the before mentioned art for sending commands to either the line 21 for (alpha) data entry or line 23 for entering computer command signals.

One selected operating mode can be the program mode such as displayed on the FIG. 2 display panel 21 embodiment, as selected by keystroke inputs at line 24, of FIG. 3. Once this program mode is selected, the various program steps are written by double-stroke entries from the keys as set forth on the chart 18'. This includes a full set of alphabetic characters in lower and upper case as well as a set of arithmetic, business, and data processing functions available for program mode entries.

Figure 4:
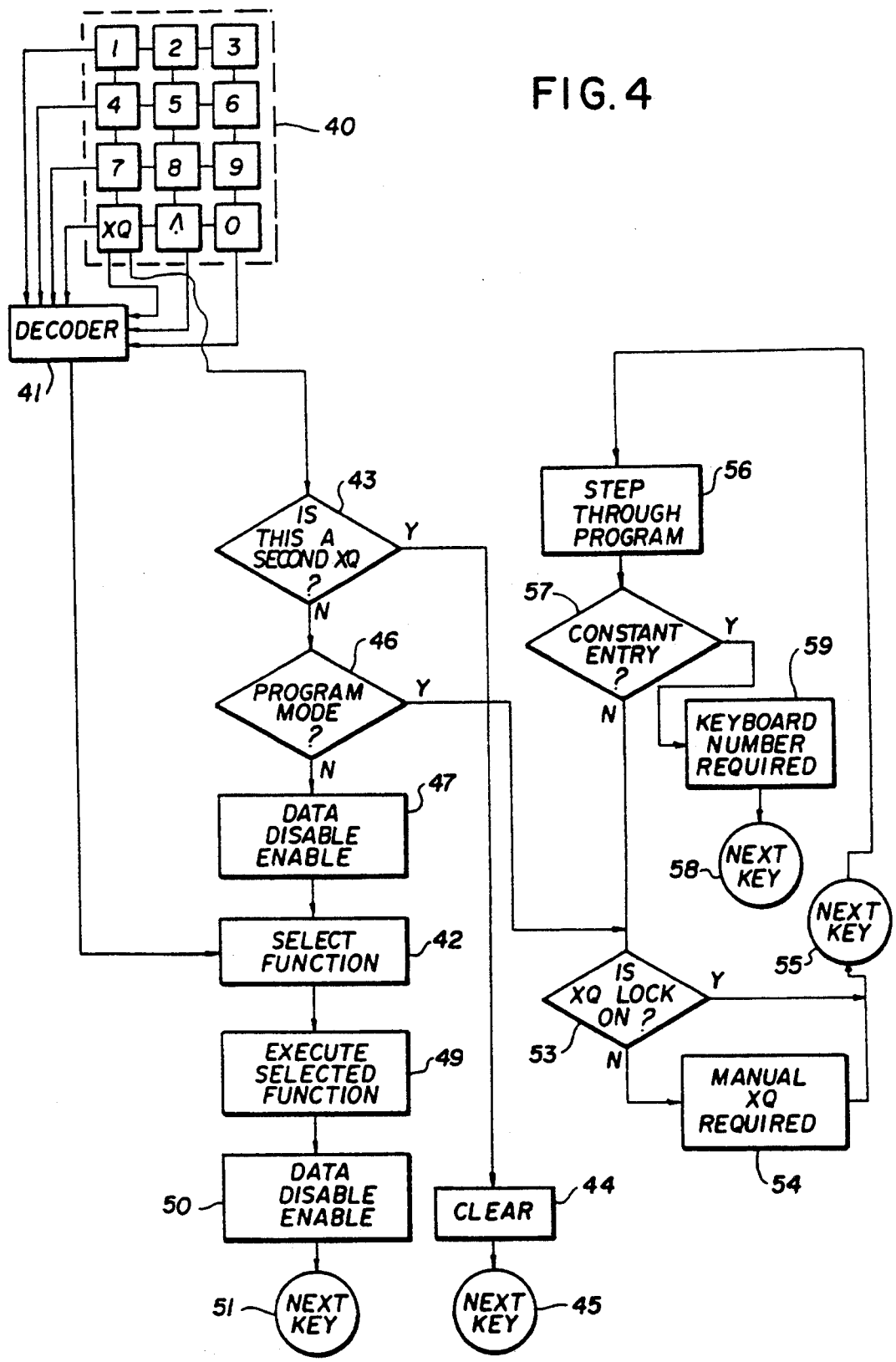
FIG. 4 is a logic flow diagram of the computer to keyboard interface system afforded by this invention.
Figure 5:
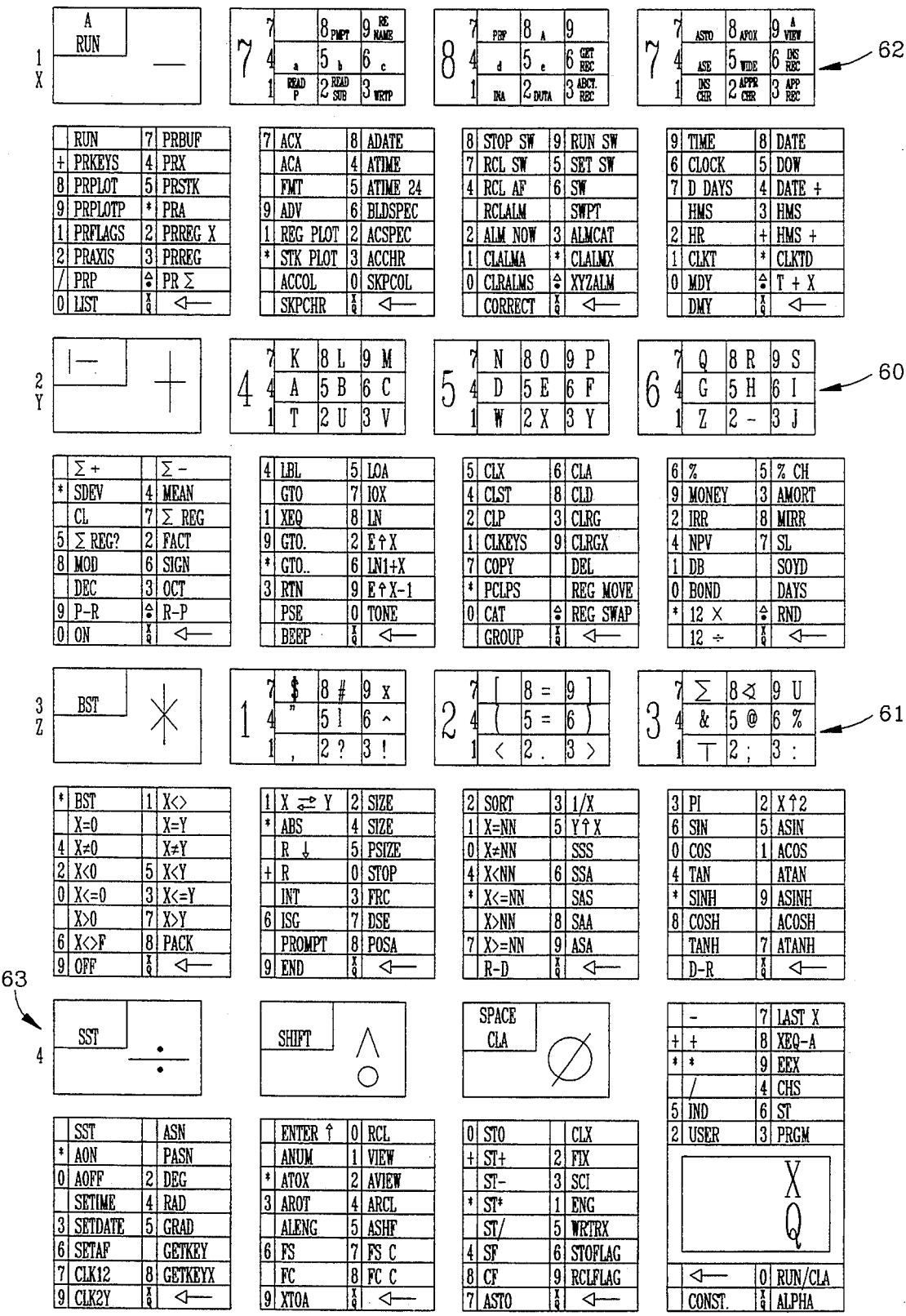
FIG. 5 is an alternate keyboard layout for an improved computer-keyboard system for executing even more entries per keyswitch, and in particular providing access to large numbers of selections, such as the entire alphabet from a group of three initial key selections at fingertip positions.

Another mode shown on FIG. 2 is the alpha mode (35, FIG. 4). This will be an operating mode making available the entire alphabet in lower and upper case for manipulation by the single row of keys 7, 8, 9, ÷ for the first stroke entry. Note that ergonomically the vowels A, E, I and 0 use the same key for the second stroke, namely 7—7, 8—8, 9—9, and ÷—÷ for enhancing input efficiency. The alpha mode can be a completely separate mode for operations such as typing or word processing, as will later be discussed in connection with FIG. 5.

The twelve keys of keyboard 40 of FIG. 4 are set forth to generally indicate that minimal number of keys which can fully operate the computer in the manner hereinbefore described to interface with hundreds or thousands of functions available on a computer chip. As shown by previous examples, more keys can be used advantageously, but in general this invention permits access to more computer functions with fewer keys than the prior art keyboards. Basically the keyboard legend on the individual keys identifies the key data input entry under the live keyboard one-stroke data entry mode.

Decoder 41 converts the keystroke information as required to operate the computer in its various modes of operation. For this invention, the keyboard-to-function select operation interface is of primary importance, and the block 42 signifying that function derives instructions decoded from keyboard 40, when in the execute or select function mode introduced by the execute key XQ.

Further use of the execute key XQ for clearing the register is shown by logic block 43, which clears or voids the appropriate computer register as designated at block 44 if there is a yes decision Y at 43 that the signal comes from a second XQ keystroke. After clearance the computer is activated for next key entry 4B.

Also the program mode logic is typical as illustrated by program mode logic selector 46. This serves when not in the program mode to use the single XQ keystroke to disable the data mode and to enable the function mode at block 47. After a function is selected at 42 from the two (or more) successive keystrokes line 48, the function is automatically executed at block 49. Thereafter automatically the data input mode is restored at 50 for the next key operation 51.

In the program mode (line 52), inquiry is made at 53 whether the XQLock mode is in effect, and if not manual XQ keystroke is required 54 to operate the next key 55 for stepping the program at block 56. Alternately it may be desirable to Have the XQ lock on whenever computer is in the program mode. This choice is preferably made when the specific purpose purpose of the computer has been decided upon. When the constant entry mode is sensed at logic choice box 57, then a numeric word is required to be manually entered at box 59 which when completed enables the computer operation to continue with the next key 58.

In this typical manner the aforesaid computer operation is diagrammed and put into effect by those skilled in the art.

In the FIG. 3 keyboard embodiment, operation in the alpha mode will in the computer system select the key functions as shown along rows 60, 61, 62, 63. Note that this permits the first of two keystrokes to select 27 characters including the entire alphabet with only three keys 4, 5 and 6, which are adjacent aligned keys manipulated by three fingers of one hand.

Clearly, it is demonstrated by this embodiment that the number of selections possible from a few keys when changing the functions selected by key sets in different operating modes becomes very large. Note that the set of functions in the alpha mode does not overlap or duplicate those in the rest of the chart which are selected in the general two-stroke entry mode afforded by the XQ-XQ keystroke sequence, as shown by the arrow near the bottom right of the keyboard chart.

Note also the shift and space functions of the decimal point and 0 keys in the alpha mode, as shown along row 63, punctuation along row 61, and a group of instructions available for processing data in row 62.

By making available a plurality of key selected sets of functions for the few keys of the keyboards, various special purpose keyboard configurations may be made available. For example, instead of an alpha mode, a specialty such as navigation computations could be incorporated to take advantage of functions made available an appropriate module in the computers of the class indicated hereinbefore. Thus, consider the various key function sets available in this embodiment of FIG. 5, namely, (1) single stroke (line) numerical calculations from the basic sixteen keys, (2) a two-stroke mode making available the 256 operations charted alongside the respective sixteen keys, and (3) the various key selections of the alpha mode entered by a two-stroke selection in mode (2).

Figure 6:
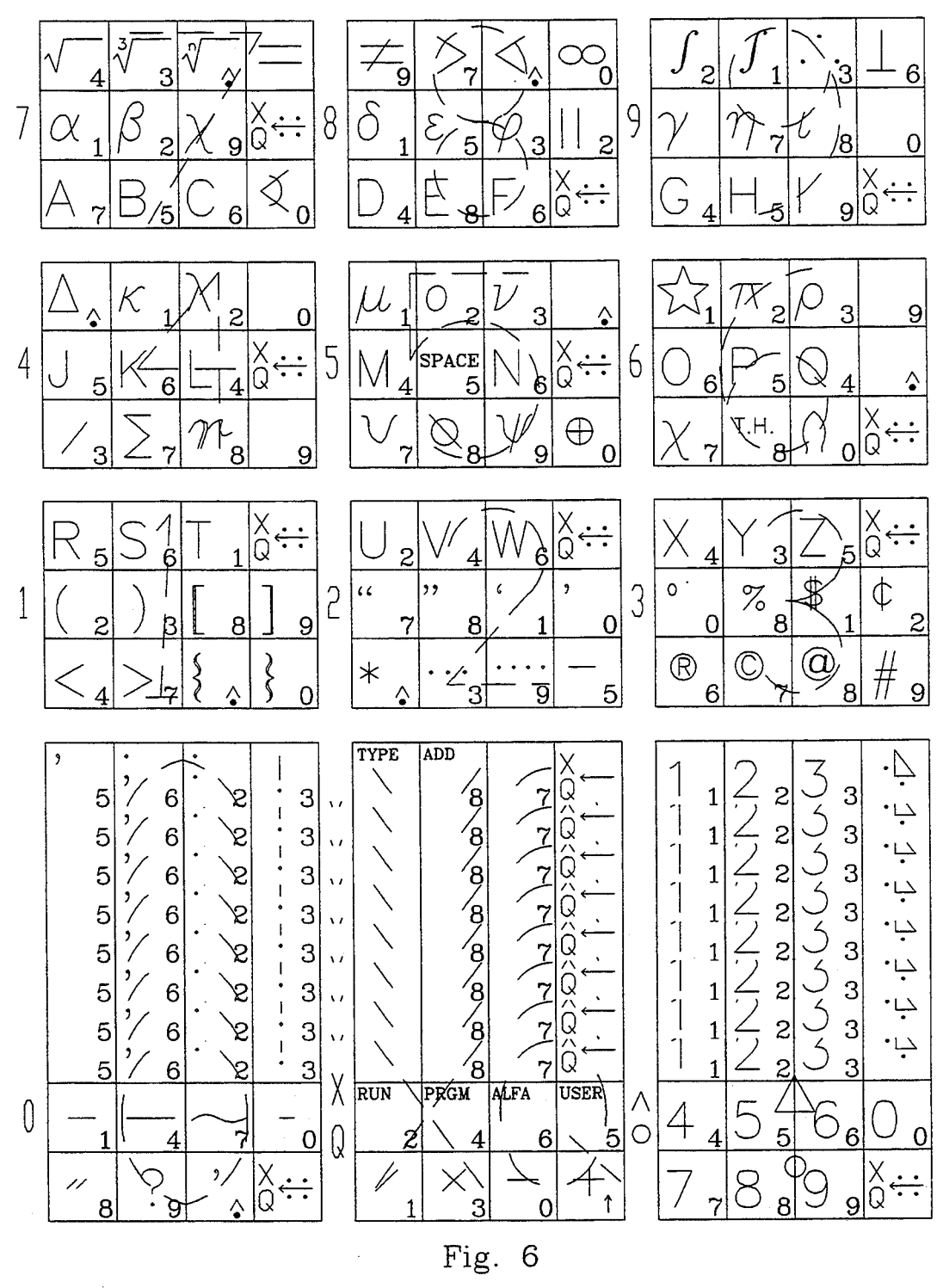

A simplified numerical calculator computer embodiment of a keyboard is shown in FIG. 6, having the numerical digits 0–9 and two control keys, XQ and ÷, the latter acting both as a decimal point and as an enter key when the second decimal point of a numerical word is encountered. These computers conventionally enter digits or characters in sequence to form numerical word entries for appropriate data manipulation or calculation in response to a single keystroke. By using the two-stroke mode the 144 designated entries can be made plus the twelve basic entries, namely decimal digits plus two control keys, which are shown over the key face in phantom and alongside the respective keys in small print. This version could be used in the two stroke mode only, if desired, wherein 144 selections are available, including the basic numerical digits and control functions.

In any event, it is evident that this invention has not only reduced the number of keys in computer keyboard systems but has enhanced the computers by making them useful at all times over a large range of their capabilities from the graphical display of instructions integrally on the computer keyboard for visibility by the operator to identify those accessible functions needed, and thus significantly reducing program time, and increasing the usefulness of the computer.

Having therefore improved the state of the art, those features of novelty believed descriptive of the spirit and nature of the invention are defined with particularity in the claims.

I claim:

1. A hand-held data processing system for processing alphanumeric data having a plurality of modes of operation, comprising in combination:

a multipurpose computer operating system, hand-held casing means containing the computer system, a temporary electronic display screen operable from said system adapted for display of alphanumeric data and carried by said casing means, a keyboard carried by said casing having a plurality n of more than six and less than seventeen manually operable keys, said operating system further comprising entry means employing said keyboard for entering data and instructions directly from the manually operable keys into the system to input functions, instructions, alphanumeric characters employing a complete twenty six character alphabet, and changes between said plurality of modes of operation, means providing at least one of said keys for actuation to cause the computer to enter a data processing mode of operation for entering into the operating system a set of functions including said operating modes and alphabetic data, said set of functions significantly exceeding the number of keys n for processing up to $n^2$ functions with said n keys, visual indicia displayed by sub-sets of said functions in n locations for ready recognition of respective input functions available by first stroking respective ones of said n keys, means operable in said data processing mode for entering twenty-six alphabet characters and said set of functions with two sequential keystrokes from said keys, said visual indicia sub-sets of functions being visibly located on said casing with a designation for identifying a first key to be stroked accompanying each of said sub-sets of functions, thereby indicating both keys to be stroked together with the stroking sequence of two keys for entering said alphabet characters and functions into the computer, and visual status indication means including said temporary electronic display screen for indicating in response to the computer operating system to the user by visual alpha indicia different ones of said modes of operation as an auxiliary display separate from any display of alphanumeric data being processed.

2. A portable hand-held data processing system, comprising in combination, a multipurpose data processor operable in a plurality of modes of alphanumeric operation for effecting different multiple purpose computer operations in response to input data and instructions, a hand-held casing containing said system, a keyboard with a plurality n of more than six and less than seventeen manually operable keys located on said hand-held casing, entry means employing said keyboard keys for implementing data and instruction entries into the computer by both single keystrokes and a sequence of two successive keystrokes, means for processing alphanumeric data encompassing twenty six alphabet characters enterable from said keys, indicia means located on said hand-held casing for visually identifying by descriptive visible legends a comprehensive range up to $n^2$ of said data and instruction entries into the computer from said keys thereby avoiding the necessity to consult an instruction manual, said indicia means legends on the keyboard for indicating said data and instruction entries and additionally identifying respectively a first and second keystroke by associating corresponding sets of legends for those functions enterable from a first of said two successive keystrokes for each key and the second keystroke entry for each function identified in the sets, further indicia means identifying current operating mode legends on a temporary electronic display screen, and entry processing means for entering with said two successive keystrokes data, alphabetic characters and a set of comprehensive instructions for computer operation in an alpha data entry input mode responsive to inputs from said keyboard key of two-stroke keystroke sequences identified by said legends.

3. The computer system of claim 2 further comprising a keyboard with the keys separated by spacings greater than finger widths so that finger strokes of individual keys are made without significant chance for fingering a wrong key.

4. The computer system of claim 2 further comprising a subset of said keys operable for entry of a complete set of said twenty-six alphabet characters in response to said two successive keystrokes.

5. A hand-held alphanumeric data processing system selectively providing a plurality of modes of operation, comprising in combination:

a multipurpose computer operating system for processing alphanumeric data, a hand-held size casing containing said data processing system, a keyboard carried by said casing having a plurality of n manually operable keys spaced for ready individual manual access by human fingers, entry means for inputting data, alphabetic characters and computer instructions from said keys including means for instituting said modes of operation, an operating subsystem for entering from said keys a complete set of alphabet characters and a set of computer operating instructions numbering up to $n^2$ entries with each entry made in a mode requiring two sequential keystrokes from said keys, visual indicia for identifying the two sequential keys to be stroked on a chart identifying each said key to be stroked first together with a set of legends identifying a subset of said entries, each legend in the set further being identified by a second key to be stroked in sequence for entry of the function identified by that legend, whereby said set of computer operating instructions is identified together with the sequence of two key strokes for entering each of the entries into the computer, said visual indicia being displayed on the case at a location for ready recognition while operating the system, and a status indicator including a temporary electronic display screen carried by said casing in close proximity to said keyboard for indicating to the user by visual alpha indicia the current mode of operation.

* * * * *